United States Patent
Mukherjee

(10) Patent No.: US 11,842,198 B1
(45) Date of Patent: Dec. 12, 2023

(54) MANAGING OUT-OF-ORDER RETIREMENT OF INSTRUCTIONS BASED ON RECEIVED INSTRUCTIONS INDICATING START OR STOP TO OUT-OF-ORDER RETIREMENT

(71) Applicant: Marvell Asia Pte, Ltd., Singapore (SG)

(72) Inventor: Shubhendu Sekhar Mukherjee, Southborough, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/515,712

(22) Filed: Nov. 1, 2021

Related U.S. Application Data

(63) Continuation of application No. 16/862,703, filed on Apr. 30, 2020, now Pat. No. 11,194,584.
(Continued)

(51) Int. Cl.
*G06F 9/38* (2018.01)
*G06F 9/32* (2018.01)
(Continued)

(52) U.S. Cl.
CPC .......... *G06F 9/3855* (2013.01); *G06F 8/4441* (2013.01); *G06F 9/30079* (2013.01);
(Continued)

(58) Field of Classification Search
CPC .... G06F 9/3855; G06F 9/3865; G06F 8/4441; G06F 9/30079; G06F 9/327; G06F 9/3867
See application file for complete search history.

(56) References Cited

U.S. PATENT DOCUMENTS

| | | |
|---|---|---|
| 5,606,670 A | 2/1997 | Abramson et al. |
| 5,937,199 A * | 8/1999 | Temple .................. G06F 13/24 710/262 |

(Continued)

OTHER PUBLICATIONS

Alipour, M et al. Exploring the Performance Limits of Out-of-order Commit. CF'17: Proceedings of the Computing Frontiers Conference, May 2017, pp. 211-220 [online], [retrieved on Mar. 21, 2021 ]. Retrieved from the Internet <URL: https://dl.acm.org/doi/abs/10.1145/3075564.3075581 > <DOI: 10.1145/3075564.3075581 >.
(Continued)

*Primary Examiner* — Shawn Doman
(74) *Attorney, Agent, or Firm* — Young Basile Hanlon & MacFarlane, P.C.

(57) ABSTRACT

Retiring instructions out-of-order includes: receiving processor instructions comprising two or more and fewer than all processor instructions generated based on a program, where the processor instructions include a first instruction and a second instruction such that the first instruction precedes the second instruction in a program order of the program; receiving a start instruction that immediately precedes the processor instructions and indicates that the processor instructions are to be retired out-of-order; receiving a stop instruction immediately that succeeds the processor instructions and indicates a stop to out-of-order instruction retirement; and, in response to completing execution of the second instruction before completing execution of the first instruction, retiring the second instruction before retiring the first instruction.

20 Claims, 5 Drawing Sheets

Related U.S. Application Data

(60) Provisional application No. 62/876,505, filed on Jul. 19, 2019.

(51) Int. Cl.
*G06F 8/41* (2018.01)
*G06F 9/30* (2018.01)

(52) U.S. Cl.
CPC .......... *G06F 9/327* (2013.01); *G06F 9/3865* (2013.01); *G06F 9/3867* (2013.01)

(56) References Cited

U.S. PATENT DOCUMENTS

| | | | |
|---|---|---|---|
| 6,076,153 A * | 6/2000 | Grochowski | G06F 9/3865 712/E9.05 |
| 6,131,157 A | 10/2000 | Wang et al. | |
| 6,542,984 B1 * | 4/2003 | Keller | G06F 9/3842 712/214 |
| 7,055,021 B2 | 5/2006 | Kadambi | |
| 7,096,345 B1 | 8/2006 | Chen et al. | |
| 8,074,060 B2 | 12/2011 | Col et al. | |
| 10,409,612 B2 | 9/2019 | Dixon et al. | |
| 2002/0144096 A1 | 10/2002 | Burch | |
| 2004/0088704 A1 * | 5/2004 | Owen | G06F 9/4887 718/100 |
| 2005/0138480 A1 * | 6/2005 | Srinivasan | G06F 9/3861 712/E9.05 |
| 2007/0186081 A1 | 8/2007 | Chaudhry et al. | |
| 2009/0164734 A1 | 6/2009 | Robinson | |
| 2010/0169611 A1 | 7/2010 | Chou et al. | |
| 2013/0339960 A1 * | 12/2013 | Greiner | G06F 9/30025 718/101 |
| 2015/0378731 A1 | 12/2015 | Lai et al. | |
| 2016/0011876 A1 | 1/2016 | Mukherjee et al. | |
| 2016/0179586 A1 | 6/2016 | Wang et al. | |
| 2016/0283247 A1 | 9/2016 | Venkatasubramanian et al. | |
| 2017/0083343 A1 * | 3/2017 | Burger | G06F 9/3802 |
| 2017/0177338 A1 * | 6/2017 | Gschwind | G06F 9/4812 |
| 2020/0278882 A1 * | 9/2020 | Horsnell | G06F 9/3861 |

OTHER PUBLICATIONS

Duong, N et al. Compiler-Assisted, Selective Out-Of-Order Commit. IEEE Computer Architecture Letters, vol. 12, No. 1, May 22, 2012, pp. 21-24 [online], [retrieved on Mar. 21, 2021]. Retrieved from the Internet <URL: https://ieeexplore.ieee.org/abstract/document/6203470> <DOI: 10.1109/L-CA.2012.8>.

Marti, SP et al. A Complexity-Effective Out-of-Order Retirement Microarchitecture. IEEE Transactions on Computers, vol. 58, No. 12, Dec. 2009, pp. 1626-1639, [online], [retrieved on Mar. 21, 2021]. Retrieved from the Internet <URL:https://ieeexplore.ieee.org/document/5161254> <DOI: 10.1109/TC.2009.95 >.

Ubal, R et al. A Sequentially Consistent Multiprocessor Architecture for Out-of-Order Retirement of Instructions. IEEE Transactions on Parallel and Distributed Systems, vol. 23, No. 8, Aug. 2012, pp. 1361-1368 [online], [retrieved on Mar. 21, 2021]. Retrieved from the Internet <URL:https://ieeexplore.ieee.org/documen.

\* cited by examiner

MANAGING OUT-OF-ORDER RETIREMENT OF INSTRUCTIONS BASED ON RECEIVED INSTRUCTIONS INDICATING START OR STOP TO OUT-OF-ORDER RETIREMENT

CROSS-REFERENCE TO RELATED APPLICATION(S)

This application is a continuation of U.S. patent application Ser. No. 16/862,703 filed Apr. 30, 2020, which claims the benefit of U.S. Provisional Application Patent Ser. No. 62/876,505, filed Jul. 19, 2019, the entire disclosures of which are hereby incorporated by reference.

TECHNICAL FIELD

This disclosure relates in general to processors and more specifically to managing out-of-order retirement of instructions.

BACKGROUND

A processor pipeline includes multiple stages through which instructions advance, a cycle at a time. In a scalar processor, instructions proceed one-by-one through the pipeline, with at most a single instruction being committed per cycle. In a superscalar processor, multiple instructions may proceed through the same pipeline stage at the same time, allowing more than one instruction to issue per cycle up to an issue width.

Some processors allow instructions to be reordered and issued out-of-order, which potentially increases overall pipeline throughput. However, to ensure that results of those instructions correspond to program order, such processors may ensure that committing of instructions (also called retiring of instructions) occurs in-order. In such processors, a reorder buffer can be used to temporarily store results (and other information) associated with instructions to enable the instructions to be committed in-order.

SUMMARY

In one aspect, in general, an apparatus for retiring instructions out-of-order includes a first one or more pipeline stage of a processor configured to: receive processor instructions comprising two or more and fewer than all processor instructions generated based on a program, where the processor instructions include a first instruction and a second instruction such that the first instruction precedes the second instruction in a program order of the program; receive a start instruction that immediately precedes the processor instructions and indicates that the processor instructions are to be retired out-of-order; receive a stop instruction immediately that succeeds the processor instructions and indicates a stop to out-of-order instruction retirement; and, in response to completing execution of the second instruction before completing execution of the first instruction, retire the second instruction before retiring the first instruction.

In another aspect, in general, a method for retiring instructions out-of-order includes: receiving processor instructions comprising two or more and fewer than all processor instructions generated based on a program, where the processor instructions include a first instruction and a second instruction such that the first instruction precedes the second instruction in a program order of the program; receiving a start instruction that immediately precedes the processor instructions and indicates that the processor instructions are to be retired out-of-order; receiving a stop instruction immediately that succeeds the processor instructions and indicates a stop to out-of-order instruction retirement; and, in response to completing execution of the second instruction before completing execution of the first instruction, retiring the second instruction before retiring the first instruction.

Aspects can include one or more of the following features.

Circuitry is configured to: receive, while the processor instructions are executing, an interrupt; and delay handling of the interrupt until the processor instructions are processed.

Delaying the handling of the interrupt until the processor instructions are processed comprises: masking the interrupt in response to receiving the start instruction; and unmasking the interrupt subsequent to retiring the processor instructions.

Unmasking the interrupt subsequent to retiring the processor instructions comprises: unmasking the interrupt in response to completing the stop instruction.

Retiring the second instruction before retiring the first instruction comprises: invalidating an entry of a reorder buffer associated with the second instruction.

The apparatus is further configured to: retire the second instruction; receive an exception subsequent to retiring the second instruction; and save a program state of the program, wherein the program state includes a result of the second instruction.

The program is generated from a high-level program that is written in a high-level language, and wherein the high-level program comprising a high-level start instruction corresponding to the start instruction and a high-level stop instruction corresponding to the stop instruction.

The apparatus further configured to: receive, while the processor instructions are executing, an interrupt; retire instructions in-order to prepare for handling the interrupt; handle the interrupt; and return to out-of-order retirement of remaining instructions of the processor instructions of the program.

The apparatus further configured to: receive, while the processor instructions are executing, an asynchronous event; and delay handling of the asynchronous event while a threshold has not expired.

Delaying handling of the asynchronous event while the threshold is not met comprises: processing a subset of the processor instructions while the threshold has not expired; performing the stop instruction after the threshold has expired; and handling the asynchronous event after the stop instruction has been performed.

Aspects can have one or more of the following advantages.

In some situations, retiring instructions in-order may be unnecessary for maintaining correctness of the logic of a program. Thus, committing in-order can result in unnecessary bottlenecks and delays. Therefore, techniques for enabling the out-of-order committing (i.e., retiring) of instructions are desirable.

These and other aspects of this disclosure are disclosed in the following detailed description of the implementations, the appended claims and the accompanying figures.

BRIEF DESCRIPTION OF THE DRAWINGS

The disclosure is best understood from the following detailed description when read in conjunction with the accompanying drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

DETAILED DESCRIPTION

Figure 1:
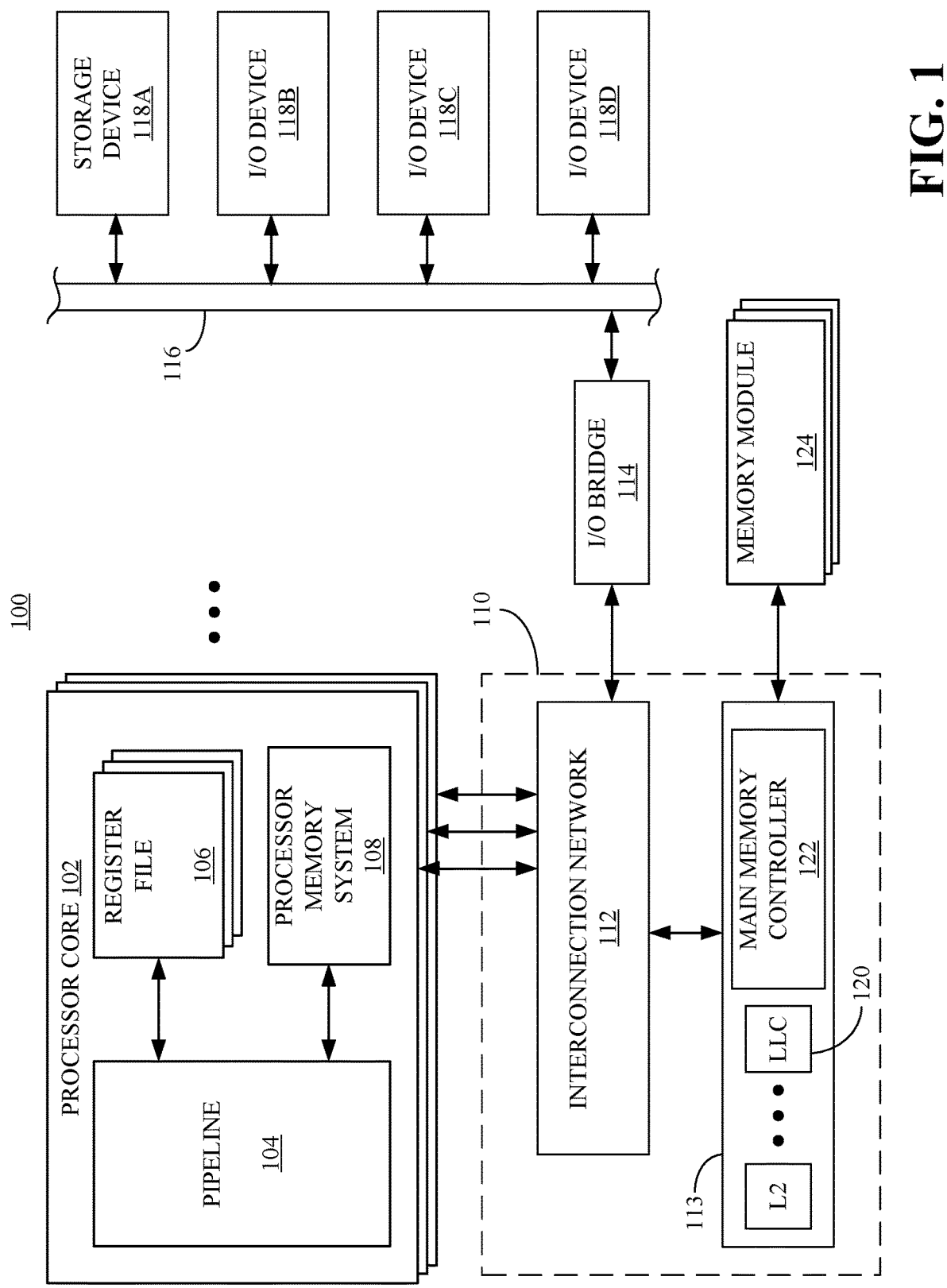
FIG. 1 is a high-level block diagram of an example of a computing system 100.

It is to be understood that the terminology used herein is for the purpose of describing particular embodiments only, and is not intended to limit the scope of the present disclosure, which will be limited only by the appended claims.

A program can be written in a high-level language, such as C, C++, Java, or some other high level language. The high-level language program can be ultimately translated (such as using a compiler, an interpreter, or the like) into a set of low level instructions (or, simply, instructions) according to an instruction set, that can be directly processed by a processor, such as a superscalar processor.

The superscalar processor can pipeline the instructions such that several instructions of the program can be in the same phase (i.e., stage) of the pipeline at the same time. Pipelining can convert an ostensibly sequential set of instructions into a more parallel one.

As further described below with respect to FIG. 2, a pipeline can include several stages, including one or more execution stages. Different instructions of a program can require a different number of cycles in an execution stage (i.e., a different number execution cycles). For example, a floating point multiplication instruction (e.g., fMUL) may require 10 execution cycles to complete whereas an integer add instruction (e.g., ADD) may be completed in 2 execution cycles. Thus, in a program that includes an fMUL instruction immediately followed by an ADD instruction, the fMUL instruction enters the pipeline before the ADD instruction, but the ADD instruction may complete execution before the fMUL instruction.

The ADD instruction can exit the execution stage before the fMUL instruction if, for example, the operands of the ADD instruction do not depend, directly or indirectly, on the result of the fMUL instruction. For example, in Listing 1 below, the ADD instruction does not depend on the fMUL instruction; however, in Listing 2, the ADD instruction directly depends on the fMUL instruction because the result of the fMUL instruction (i.e., the value stored in register R4) is one of the operands of the ADD instruction.

| Listing 1 | | Listing 2 | |
|---|---|---|---|
| fMUL | R4 ← R1, R2 | fMUL | R4 ← R1, R2 |
| ADD | R5 ← R6 | ADD | R5 ← R4, R6 |

In some processors, even though instructions can complete execution before preceding instructions in the program order, the results of such out-of-order completed instructions are not committed before the results of the preceding instructions in the program order. Thus, with respect to Listing 1, the result of the ADD instruction is not committed (i.e., written) until the result of the fMUL instruction is committed. This is referred to as the in-order retirement of pipelined instructions. That is, results are retired in-order according the program order (which is defined based on the order in which those instructions occur in a program listing, such as a listing generated by a compiler): the result of the fMUL instruction is committed before that of the ADD instruction.

In-order retirement of instructions can ensure that the program state (also referred to as the process state) can be recovered in the case of exceptions or interrupts. The program state can consist of the program counter, the contents of the register file, and the contents of the memory. An interrupt or an exception is said to be "precise" if the saved process state corresponds with the sequential model of program execution. When an interrupt is received or an exception occurs, the process state, according to the program counter, is saved; the interrupt or exception is handled; the process state is recovered (e.g., reconstituted); and the process resumes at the program counter.

As used herein, an exception is caused by an instruction of the program; and an interrupt is caused by source that is outside of the program. Examples of exceptions can include an overflow condition or an underflow condition that is caused by an instruction of the program, a divide by zero operation, an access to a non-existing or a privileged memory location, and a page fault. Examples or interrupts can include timer interrupts and I/O interrupts received from external devices.

Traditionally, and as already mentioned above, an interrupt or an exception is said to be "precise" when, inter alia, all instructions preceding the instruction indicated by the saved program counter have been executed and have modified the program state correctly; all instructions following the instruction indicated by the saved program counter are unexecuted and have not modified the process state; and, in the case of an exception, the saved program counter points to the interrupted instruction, which may or may not have executed.

In an example, an exception handler (which may be provided, for example, by a programmer) is used to, as the name suggests, handle (e.g., deal with, recover from, etc.) an exception. Typically, when an exception occurs, the process state is saved and the process is vectored to the exception handler. After the exception handler executes, the process may be vectored back to the point of the saved program counter. Thus, in this example, an exception (such as a page fault) must be taken in program order when the instruction that caused the exception is software-visible. Similarly, an interrupt is typically taken in program order.

Traditionally, interrupts and exceptions are delivered (e.g., processed, handled, etc.) close to, in program order, the point in the program where they are generated (e.g., raised, received, etc.).

Handling of interrupts or exceptions in program order can have undesirable (and, in some situations unnecessary) performance implications on a processor. As already mentioned, instructions that complete out-of-order are typically retired in-order. Mechanisms and/or structures, such as a reorder buffer or a commit buffer, have been used to ensure in-order retirement of instructions.

If an instruction experiences an exception or has an interrupt attached to it, subsequent instructions (and possibly the offending instruction itself) are thrown away and execution resumes from the exception or the interrupt. That an instruction is thrown away can mean that the result of the instruction, which may be saved to the reorder buffer or to commit buffer is discarded without saving (i.e., committing) to, for example, the registry file. In a deeply out-of-order processor, instructions queuing up (e.g., reserving space) in the reorder buffer may back up the instruction pipeline causing potentially severe performance degradations.

In some situations, in-order retirement of instructions is not necessary. For example, exceptions that occur on instructions that precede completed out-of-order instructions may not affect the results of the completed out-of-order instructions. As such, it would be wasteful to ignore the results of such completed out-of-order instructions. In another example, an immediate handling of an interrupt may not be necessary. Thus, so that the results of completed out-of-order instructions are not discarded, handling of the interrupt can be deferred until all preceding instructions of the out-of-order completed instructions are themselves retired and the completed out-of-order instructions are themselves retired.

In some implementations of out-of-order instruction retirement, specific instructions are used to bracket (e.g., surround, etc.) program instructions so that a processor can retire the program instructions out-of-order. For example, a compiler can insert the specific instructions (e.g., a start instruction and a stop instruction) around certain program instructions to indicate to the processor that the processor should retire the program instructions out-of-order. By using the specific instructions, performance of the processor can be improved because the processor need not discard the results of out-of-order completed instructions in order to handle an interrupt or an exception and re-issue these out-of-order completed instructions after the interrupt or the exception is handled.

Figure 2:
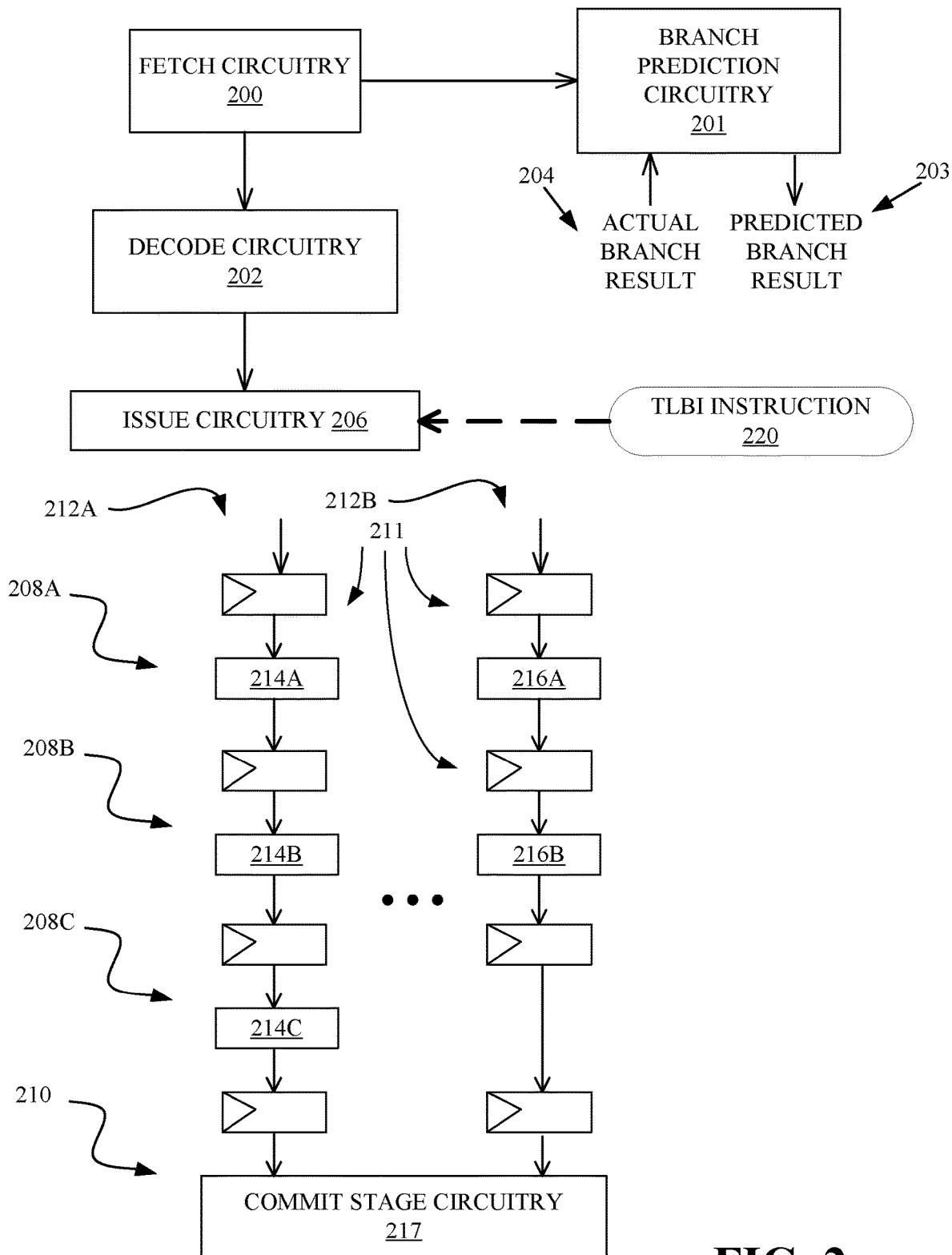
FIG. 2 is an example of a configuration of the pipeline of FIG. 1.
Figure 3:
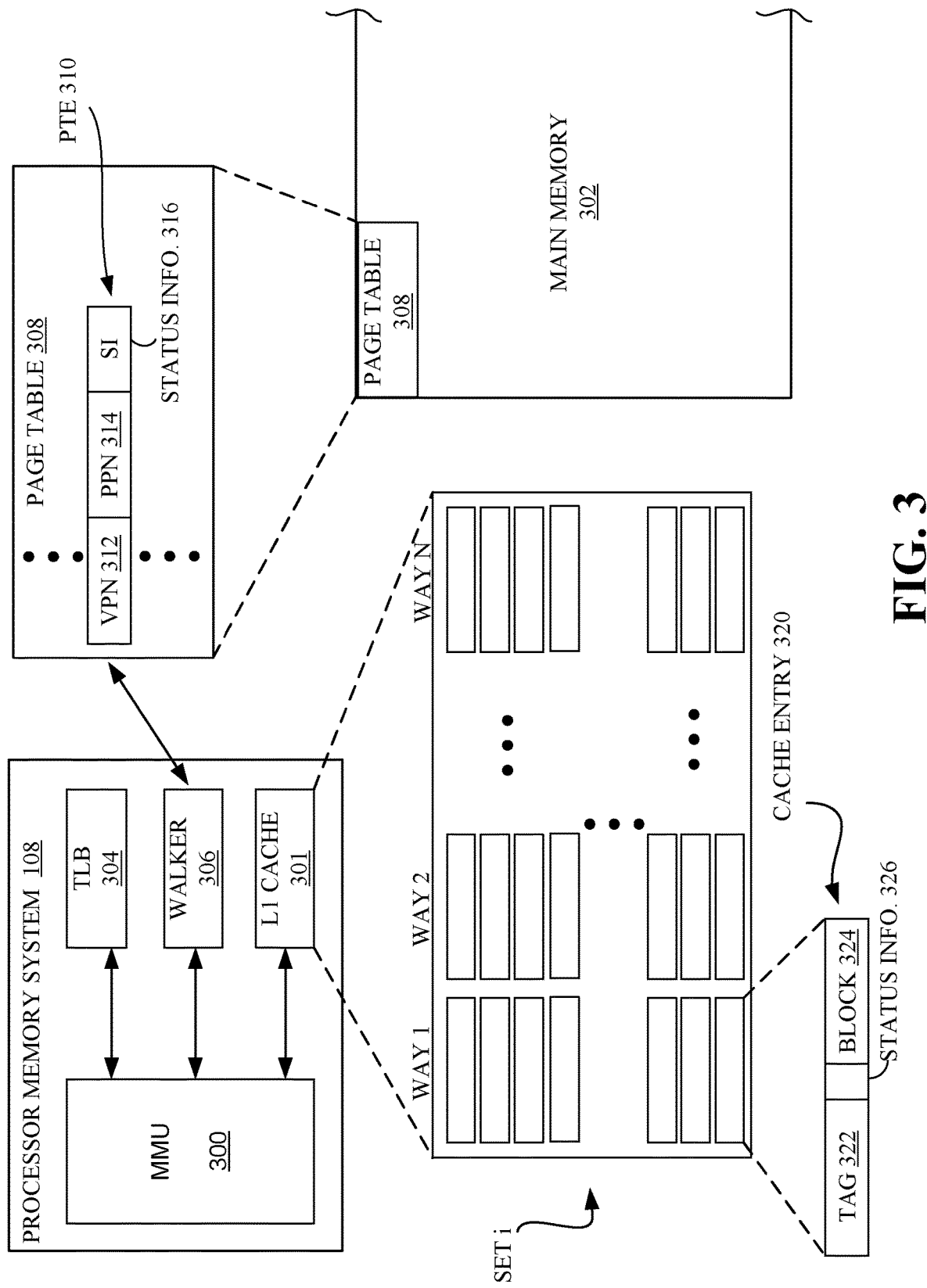
FIG. 3 is an example of a configuration of the processor memory system of FIG. 1.

Further details of techniques for managing out-of-order instruction retirement are described herein with initial reference to a system in which they can be implemented, as shown in FIGS. 1 through 3.

FIG. 1 is a high-level block diagram of an example of a computing system 100. The computing system 100 includes at least one processor core 102, which can be a single central processing unit (CPU) or one of multiple processor cores in a multi-core architecture. In a multi-core architecture each processor core (or simply "core") can include an individual CPU with associated circuitry. In this example of a multi-core architecture, each processor core 102 can include a pipeline 104, one or more register files 106, and a processor memory system 108. Each register file of the register files 106 can include one or more individually addressable registers.

Each processor core 102 can be connected to an uncore 110. The uncore 110 can include an interconnection network 112 and an external memory system 113. The interconnection network 112 can be a bus, a cross-bar switch, a mesh network, or some other interconnection network. The interconnection network 112 can enable communication between each processor core 102 and an external memory system 113 and/or an input/output (I/O) bridge 114.

The I/O bridge 114 can enable communication, such as over an I/O bus 116, with various different I/O devices including a storage device 118A and other I/O devices 118B-118D. Non-limiting examples of the other I/O devices 118B-118D can include a network interface, a display adapter, or user input devices such as a keyboard or a mouse.

The storage device 118A can be a disk drive or some other large capacity storage device. The storage device 118A can typically be a non-volatile storage device. In some examples, the storage device 118A, or a portion thereof, can be used in a virtual memory scheme. For example, a portion of the storage device 118A can serve as secondary storage (or a 'backing store') in a virtual memory scheme for the (typically volatile and/or capacity-limited) main memory. Examples of main memory include the processor memory system 108 or an external memory system, such as described below with respect to an external memory system 113.

The processor memory system 108 and the external memory system 113 together form a hierarchical memory system. The hierarchy can include any number of levels. The levels may be denoted or referred to as L1, L2, . . . , LN. The L1 level is a lower level memory than the L2 memory system, which in turn is a lower level than the L3 memory system, and so on. Typically, each level of the hierarchical memory system can include memory (e.g., a memory system) that is slower to access than that of the immediately lower level and/or each level of the hierarchical memory system can include memory (e.g., a memory system) that is faster to access, more limited in capacity, and/or more expensive than that of a higher level. Each level of the hierarchical memory system can serve as a cache.

A first level (L1) cache can be within (e.g., a part of) the processor memory system 108. Any number of higher level (L2, L3, . . . ) caches can be within the external memory system 113. The highest (i.e., last) level cache within the external memory system 113 can be referred to as the last level cache (LLC). In an example, the LLC can be the L2 cache.

At each level, the cache can include a first module that provides an instruction cache for caching instructions and a second module that provides a data cache for caching data. The memory system of a level of the hierarchical memory system can load blocks of instructions or data into entries and evict (e.g., removes, over-writes, etc.) blocks of instructions or data from entries in units of cache blocks (also called cache lines). Cache lines are further described with respect to FIG. 3.

In addition to the L1 instruction cache and data cache, the processor memory system 108 can include a translation lookaside buffer (TLB) for caching recent translations, and various other circuitry for handling a miss in the L1 instruction or data caches or in the TLB. For example, that circuitry in the processor memory system 108 of a processor core 102 can include a write buffer for temporarily holding values to be written from a store instruction being executed within the pipeline 104. The TLB is further described with respect to FIG. 3.

As already mentioned, the highest level cache within the external memory system 113 is the LLC (such as an LLC 120). The LLC 120 can be accessed (e.g., searched, etc.) just before main memory. Of course, this is only an example. The exact division between which level caches are within the processor memory system 108 and which are in the external memory system 113 can be different in other examples. For example, the L1 cache and the L2 cache can both be internal to the processor core 102 (i.e., part of the processor memory system 108) and the L3 (and higher) caches can be external to the processor core 102.

In an example, each processor core 102 can have its own internal L1 cache, and the processor cores can share an L2 cache. The external memory system 113 can also include a main memory controller 122. The main memory controller 122 can be connected to any number of memory modules 124. Each of the memory modules 124 can serve as (e.g., can be) the main memory. In a non-limiting example, one or more of the memory modules 124 can be Dynamic Random Access Memory (DRAM) modules.

In a typical example, the content of a memory address is searched for in a level (e.g., L1) of the hierarchical memory system. If not found, then the next higher level (e.g., L2) is searched; and so on. Searching for a memory address amounts to answering the question: does this memory level of the hierarchical memory system include the content of the memory address? Or, alternatively, is the memory address cached in this memory of the hierarchical memory system?

That is, in a particular cache level of the hierarchy of the hierarchical memory system, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (i.e., read or write) the memory block from a higher level cache, or from the main memory (in the case of a miss in the LLC).

The pipeline 104 can include multiple stages through which instructions advance, a cycle at a time. The stages can include an instruction fetch (IF) stage or stages, an instruction decode (ID) stage or stages, an operand fetch (OF) stage or stages, an instruction execution (IE) stage or stages, and/or a write back (WB) stage or stages. The pipeline can include other stages, as further described with respect to FIG. 2. Some stages occur in a front-end portion of the pipeline. Some other stages occur in a back-end portion of the pipeline. The front-end portion can include pre-execution stages. The back-end portion of the pipeline can include execution and post-execution stages. The pipeline 104 is further described with respect to FIG. 2.

First, an instruction is fetched (e.g., in the IF stage or stages). An instruction can be fetched based on a program counter (PC). The PC is a pointer that can be used to identify instructions within memory (e.g., within a portion of the main memory, or within an instruction cache of the core 102). The PC can advance through addresses of a block of compiled instructions (called a "basic block"). The PC can be incremented by a particular number of bytes. The particular number of bytes for incrementing the PC can depend on how long (e.g., in bytes) each instruction is and on how many instructions are fetched at a time.

After being fetched, the instruction is then decoded (e.g., in the ID stage or stages) to determine an operation and one or more operands. Alternatively, in some pipelines, the IF and ID stages can overlap. If the instruction includes operands, the operands are fetched (e.g., in the OF stage or stages).

The instruction is then ready to be issued. Issuing an instruction starts progression of the instruction through stages in a back-end portion of the pipeline to execute the instruction. In an example, execution of the instruction can involve applying the operation of the instruction to the operand(s) to produce a result for an arithmetic logic unit (ALU) instruction. In an example, execution of the instruction can involve storing or loading to or from a memory address for a memory instruction. In an example, execution of the instruction can involve evaluating a condition of a conditional branch instruction to determine whether or not the branch should be taken.

After an instruction has completed execution, the instruction can be committed (i.e., retired) so that any effect of the instruction is made globally visible to software. Committing an instruction may involve storing a result in a register file (e.g., in the WB stage or stages), for example. In most implementations, even if any instructions were issued out-of-order, all instructions are generally committed in-order.

FIG. 2 is an example of a configuration of the pipeline 104 of FIG. 1.

The pipeline 104 can include circuitry for the various stages (e.g., the IF, ID, and OF stages). For one or more instruction fetch stages, an instruction fetch circuitry 200 provides a PC to an instruction cache in a processor memory system, such as the processor memory system 108 of FIG. 1, to fetch (e.g., retrieve, read, etc.) instructions to be fed (e.g., provided to, etc.) into the pipeline 104. For example, the PC can be a virtual address of the next instruction, in which case the PC can be incremented by the length of a virtual address in the case of sequential execution (i.e., without taking any branches). Virtual addresses are described with respect to FIG. 3.

The instruction fetch circuitry 200 can also provide the program counter, PC, to a branch prediction circuitry 201. The branch prediction circuitry 201 can be used to provide a predicted branch result 203 for branch instructions. The predicted branch result 203 enables the pipeline 104 to continue executing speculatively while an actual branch result 204 is being determined. The branch prediction circuitry 201 can also store branch history information that is updated based on receiving the actual branch result 204. In some implementations, some or all of the branch prediction circuitry 201 can be considered to be a part of the instruction fetch circuitry 200.

In an example of the out-of-order execution, for one or more instruction decode (ID) stages, instruction decode circuitry 202 can store information in an issue queue for instructions in an instruction window waiting to be issued. The issue queue (which can also be referred to as an instruction queue) is such that an instruction in the queue can leave the queue when the operands of the instruction become available. As such, the instruction can leave before earlier (e.g., older) instructions in a program being executed. The instruction window refers to a set of instructions that can execute out-of-order.

An issue circuitry 206 can determine a respective cycle in which each of the instructions in the issue queue are to be issued. Issuing an instruction makes the instruction available to progress through circuitry of instruction execution (IE) stages, such as a first execution stage 208A, a second execution stage 208B, and a third execution stage 208C, of the pipeline 104. For simplicity of explanation, only three execution stages are illustrated in FIG. 2. However, the disclosure herein is not so limited: more or fewer execution stages are possible.

The pipeline 104 can include one more commit stages, such as a commit stage 210. A commit stage commits (e.g., writes to memory) results of instructions that have made their way through the IE states 208A, 208B, and 208C. For example, a commit stage circuitry 217 may write back a result into a register file, such as the register file 106 of FIG. 1. However, some instructions may not be committed by the commit stage circuitry 217. Instead, the results of the instructions may be committed by other circuitry, such as circuitry in another stage of the back-end or a stage of the front-end, possibly based on information from the commit stage.

Between adjacent stages of the pipeline 104, the various paths through the pipeline circuitry include pipeline registers. For example, shown in FIG. 2 are pipeline registers 211 for the IE stages 208A, 208B, and 208C. The pipeline registers can be used for storing results of an upstream stage to be passed downstream to a next stage. The pipeline registers 211 may be clocked by (i.e., receive a clock signal derived from) a common clock (not shown). Thus, each clock cycle, each pipeline register 211 (also called a latch, or a set of flip-flops) can pass a result from its input to its output and becomes ready to receive a new result in its input after that result has been produced by the circuitry of that stage.

There may be multiple separate paths through the IE stages. The IE stages can include various circuitry for executing different types of instructions. For illustration purposes, only two paths 212A and 212B are shown in FIG. 2. However, the execution stages can include any number of paths with corresponding circuitry, which can be separated by pipeline registers, such as the pipeline registers 211.

The number of paths through the instruction execution stages can generally be dependent on the specific architecture. In an example, enough paths can be included such that a number of instructions up to a maximum number of instructions that can progress through the same execution stages in the same cycles. The maximum number of instructions that can progress through the same execution stages in the same cycles can be referred to as the issue width.

The number of stages that include functional circuitry for a given path may also differ. In the example of FIG. 2, a first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A and the second execution stage 208B, respectively. In the second path 212B, the third execution stage 208C is a "silo stage" that passes a result along without performing further computation thereby ensuring that each path passes through the same number of stages through the pipeline.

In an example, a path can include circuitry for executing instructions using units for various operations (e.g., ALU, multiplier, floating point unit, etc.). In an example, another path can include circuitry for executing memory access instructions. The memory access instructions can include load instructions that read data values from the memory system. The memory access instructions can include store instructions to write data values to the memory system. The circuitry for executing memory access instructions can also initiate translation of virtual addresses to physical addresses, when necessary, as described in more detail below with respect to FIG. 3.

In addition to branch prediction, as described with respect to the branch prediction circuitry 201, the pipeline 104 can be configured to perform other types of speculative execution. In an example of another type of speculative execution, the pipeline 104 can be configured to reduce the chance of stalling (such as in the event of a cache miss) by prefetching. Stalling refers to the situation in which processor execution of instructions is stopped/paused.

A prefetch request can be used to preload a cache level (e.g., of a data cache) so that a future memory request is likely to hit in that cache level instead of having to access a higher cache level or a main memory. For example, a speculative memory access request can include prefetch requests that are sent to preload an instruction cache or data cache based on a predicted access pattern.

A prefetch request can be or can include a software prefetch request such that an explicit prefetch instruction that is inserted into the pipeline 104 includes a particular address to be prefetched. A prefetch request can be or can include a hardware prefetch that is performed by hardware within the processor (e.g., the processor core 102) without an explicit prefetch instruction being inserted into its pipeline (e.g., the pipeline 104).

In some cases, prefetching can include recognizing a pattern (e.g., a stream) within the memory accesses of a program, or can include speculatively performing a load instruction within a program (e.g., using a speculative address for that load instruction) before that load instruction is actually issued as part of program execution.

Various types of external instructions can be received from other processor cores. Such externally received instructions can be inserted into the pipeline 104 by the issue circuitry 206 to be handled at the appropriate stage. An example of such an externally received instruction is a TLB invalidation (TLBI) instruction 220 for invalidating entries in the TLB of that particular processor core (i.e., the receiving core). Another example of an external instruction that can be received is a GlobalSync instruction, which may be broadcast to processor cores as a side effect of a memory barrier operation performed by a processor core to ensure that the effects of any previously broadcast TLBIs have been completed. Said another way, an originating processor core that issues a broadcast TLBI instruction can subsequently issue a data synchronization barrier (DSB) instruction, which in turn causes GlobalSync instructions to be received by every other processor core. In response to the GlobalSync instruction, when a receiving processor core completes the TLBI instruction, the receiving processor core sends, or causes to be sent, an acknowledgement to the originating process core. Once the originating process core receives acknowledgements from all receiving processor cores, the originating process core can proceed with instruction execution. In some cases, an asynchronous event may cause an interrupt in a program that is being executed. In an example, the asynchronous event can be a hardware interrupt. In an example, the asynchronous event can be an external instruction (i.e., external to the program) such as the GlobalSync instruction.

FIG. 3 is an example of a configuration of the processor memory system 108 of FIG. 1. In example illustrated in FIG. 3, the processor memory system 108 includes a memory management unit (MMU) 300 that manages access to the memory system. The MMU 300 can manage the translation of virtual addresses to physical addresses.

In some implementations, the MMU 300 can determine whether a copy of a stored value (e.g., data or an instruction) at a given virtual address is present in any of the levels of the hierarchical cache system, such as in any of the levels from an L1 cache 301 up to the LLC 120 (FIG. 1) if necessary. If so, then the instruction accessing that virtual address can be executed using a cached copy of the value associated with that address. If not, then that instruction can be handled by miss circuitry to be executed after accessing the value from a main memory 302.

The main memory 302, and potentially one or more levels of the cache system, may need to be accessed using a physical address (PA) translated from the virtual address (VA). To this end, the processor memory system 108 can include a TLB 304 that stores translations, defined by VA-to-PA mappings, and a page table walker 306 for accessing a page table 308 if a translation is not found in the TLB 304. The translations stored in the TLB can include recently accessed translations, likely to be accessed translations, some other types of translations, or a combination thereof.

The page table 308 can store entries, including a page table entry (PTE) 310, that contain all of the VA-to-PA mappings currently in use. The page table 308 can typically be stored in the main memory 302 along with physical memory pages that represent corresponding mapped virtual memory pages that have been "paged in" from secondary storage (e.g., the storage device 118A of FIG. 1). Such a miss in a page table that causes a page fault is another example of an interrupt that may be caused during program execution.

A memory page can include a number of cache blocks. A cache block can include a number of words. A word is of a predetermined number (e.g., 2) of bytes. A byte is a group of bits (e.g., 8 bits), which can be operated on as a unit. A byte can be considered a unit of memory size.

Alternatively, in a virtualized system with one or more guest operating systems managed by a hypervisor, virtual addresses (VAs) may be translated to intermediate physical addresses (IPAs), which are then translated to physical addresses (PAs). In a virtualized system, the translation by a guest operating system of VAs to IPAs may be handled entirely in software, or the guest operating system may have some hardware assistance from the MMU 300.

The TLB 304 can be used for caching recently accessed PTEs from the page table 308. The caching of recently accessed PTEs can enable the translation to be performed (such as in response to a load or a store instruction) without the page table walker 306 having to perform a potentially multi-level page table walk of a multiple-level data structure storing the page table 308 to retrieve the PTE 310. In an example, the PTE 310 of the page table 308 can store a virtual page number 312 and a physical page number 314, which together serve as a mapping between a VA and a PA that defines a translation of that VA.

An address (i.e., a memory address) can be a collection of bits. The bits of the memory address can be divided into low-order bits and high-order bits. For example, assuming 32-bit addresses, an example of a memory address is 01101001 00101000 00001101 01011100. The low-order bits are the rightmost 16 bits (i.e., 00001101 01011100); and the high-order bit are the leftmost 16 bits (i.e., 01101001 00101000). The low-order bits of a memory address can be used as a page offset. The low-order bits can be identical for a VA and its mapped PA. Thus, the high-order bits of a memory address can be used as a memory page number to specify the mapping.

The PTE 310 can also include status information (SI) 316. The SI 316 can indicate whether or not the page is resident in the main memory 302 or whether the page should be retrieved from secondary storage. When the PTE 310 is stored in an entry of any of the TLB 304, there may also be additional information for managing the transfer of PTEs between the page table 308 and the TLB 304, and for invalidating PTEs in the TLB 304. In an example, invalidating PTEs in the TLB 304 can be accomplished by toggling a bit (that indicates whether the entry is valid or not) to a state (i.e., a binary state) that indicates that the entry is invalid. However, other ways of invalidating PTEs are possible.

If a valid entry in the TLB 304 that matches with a portion of a VA to be translated is found (i.e., a "TLB hit"), then the PTE stored in that entry is used for translation. If there is no match (i.e., a "TLB miss"), then the page table walker 306 can traverse (or "walk") the levels of the page table 308 retrieve a PTE.

The L1 cache 301 can be implemented in any number of possible ways. In the implementation illustrated in FIG. 3, the L1 cache 301 is illustrated as being implemented as an N-way set associative cache module. Each cache entry 320 of the L1 cache 301 can include bits for storing a particular cache block 324 that has been copied from a physical page in the main memory 302 (possibly via higher level cache module).

The cache entry 320 can also include bits for storing a tag 322. The tag 322 can be made up of a number of the most significant bits of a virtual address, which are common to the words of that entry. For a virtually indexed, virtually tagged (VIVT) type of cache module, in addition to comparing a tag portion of a virtual address of desired data, the cache module can compare an index portion of the virtual address (which can be made up of middle bits between the tag and a block offset) to determine which of multiple sets may have a cache entry containing those desired data.

For an N-way set associative cache, the tag comparison can be performed N times (possibly in parallel) for the selected "set" (i). The comparison can be performed once for each of N "ways" in which a cache block containing the desired data may be stored.

The block offset can then be used to select a particular word from a cache block that is found in the cache entry (i.e., a 'cache hit'). If the tag does not match for any of the ways of the selected set (i.e., a 'cache miss'), then the cache system can attempt to retrieve the cache block from a higher level cache or from the main memory 302 (in the case of the LLC). The cache entry 320 can also include bits for storing status information 326. The status information 326 can include, for example, a valid bit and/or any flags or error correction bits. While a miss in a cache may cause a stall in a pipeline, such a miss does not typically cause an interrupt or an exception.

Figure 4:
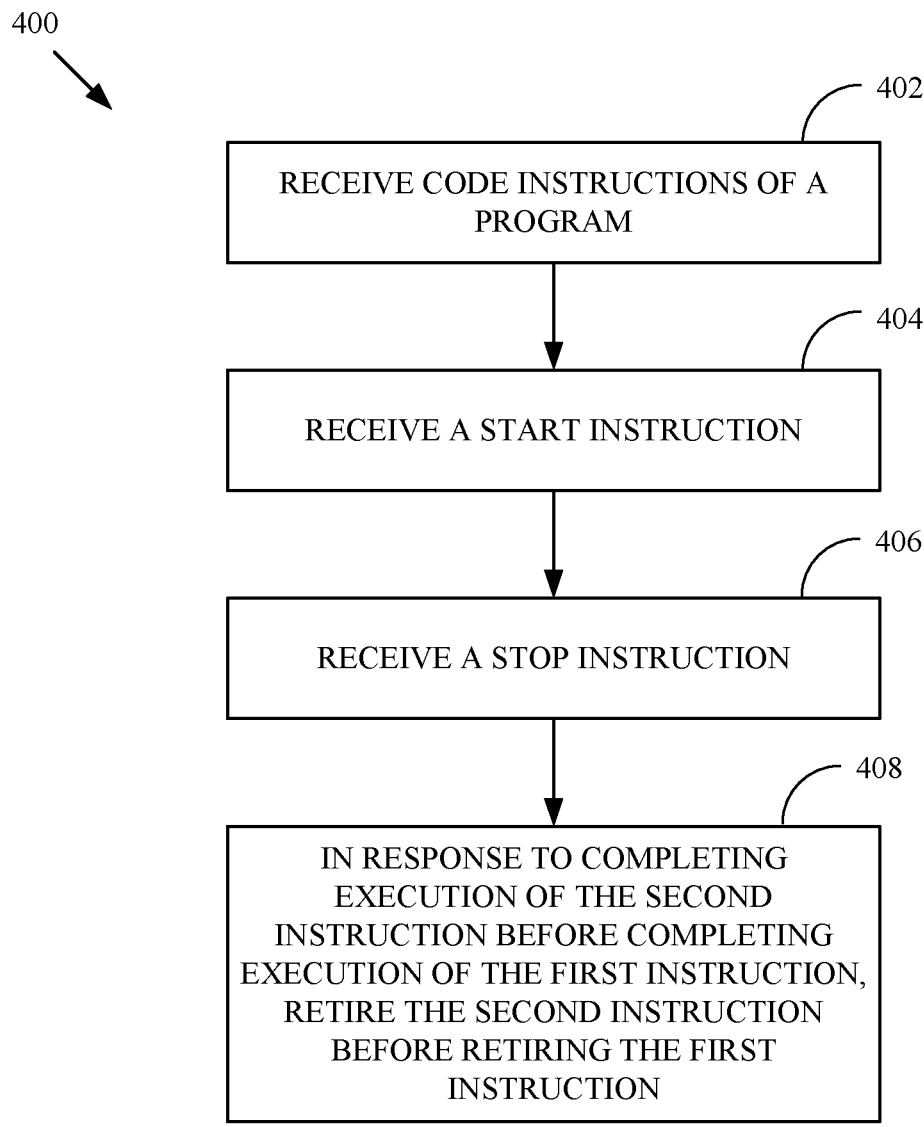
FIG. 4 is an example of a flowchart of a technique for out-of-order retirement of instructions.

FIG. 4 is a flowchart of an example of a technique 400 for out-of-order retirement of instructions.

The technique 400 can be implemented by a computing system, such as the computing system 100 of FIG. 1. For example, the technique 400 can be implemented by a processor of the computing system, such as one processor core 102 of FIG. 1. The technique 400 can be implemented, partially or fully, as executable instructions that can be executed by the processor. The technique 400 can be implemented, partially or fully, using specialized hardware or firmware. For example, the computing system can include circuitry that implements at least some aspects of the technique 400.

The technique 400 can be used to manage out-of-order retirement of instructions. For example, the technique 400 can be used to allow instructions that may have been issued out-of-order to also be retired out-of-order if those instructions have finished executing out-of-order (e.g., by temporarily lifting a requirement that all instructions are retired in program order). The technique 400 can receive a set of instructions which can be retired out-of-order. This set of instructions can be, for example, a portion of a program that includes fewer than all instructions that were generated (e.g., by a compiler) based on a program. The technique 400 can receive instructions that bracket (i.e., bracketing instructions) the set of instructions, which indicate to the technique 400 that the instructions of the set of instructions can be retired out-of-order. The bracketing instructions can include a start instruction and a stop instruction. Any instructions between the start instruction and the stop instruction can be retired out-of-order.

In an example, a programming language (e.g., C++, Java, assembly, etc.) can provide semantic, syntax, or directive elements that can be indicative of the start instruction and the stop instruction. In an example, the C++ programming language may include directives that a programmer can use to direct a compiler to include processor instructions indicative of out-of-order retirement. Simply for illustrative purposes, the directives can be "#OOO start" and "#OOO stop." Listing 3 is an illustrative example of the start and stop directives.

| Listing 3 | |
|---|---|
| 1 | int radius = 5; |
|   | float area; |
| 2 | . . . |
| 3 | #OOO start |
| 4 | area = 3.14 * radius * radius; |
| 5 | radius++; |
| 6 | #OOO stop |
| 7 | . . . |

At row 1 of Listing 3 above, the variables radius and area are declared. The area variable is a floating point number. The radius variable is an integer number and is initialized to the value 5. Row 2 indicates that there may be other code between row 1 and row 3. By inserting the directives at row 3 (i.e., the start instruction "#OOO start") and row 6 (i.e., the stop instruction "#OOO stop"), the programmer is indicating to the compiler that the instructions corresponding to code at rows 4-5 (for simplicity referred to as the instructions at rows 4-5), which are bracketed (e.g., surrounded, etc.) by the start and stop instructions, can be retired out-of-order. The programmer may have sufficient confidence (e.g., certainty) that the instructions at rows 4-5 do not cause any exceptions and/or are not likely to be affected by an exception. Furthermore, the use of the start and stop instructions by the programmer can indicate that, if an interrupt is received while any of the instructions at rows 4-5 are still not retired, handling of the interrupt can be deferred by the processor until the instructions are retired. At row 7, in-order retirement of instructions is resumed.

As can be appreciated, the instruction(s) at row 4 involve 2 floating point multiplication operations whereas the instruction at row 5 merely increments an integer variable by 1. Thus, in a pipelined processor, the instruction at row 5 exists the execution stage(s) of the pipeline before the instruction(s) at row 4 even if those instructions are issued in-order. Thus, the instruction at row 5 can be retired before the instruction(s) at row 4 retire.

It is noted, though, that for simplicity of explanation, the code statements of the Listing 3 are referred to as instructions. However, as a person skilled in the art appreciates, each of the rows 4-5 can be compiled into multiple processor instructions, including loading from memory into registers, writing intermediate results to registers, storing final results from registers to memory, and so on. Additionally, while only two (2) statements (i.e., rows 4-5) are bracketed by the start (i.e., row 3) and stop (i.e., row 6) instructions, the disclosure is not so limited. Any number of statements (and, equivalently, processor instructions) can be bracketed by the start and stop instructions.

Listing 4 provides another example of start and stop instructions in a high-level programming language. The Listing 4 may be a listing of a piece of code that is written in the Java programming language. The code of the Listing 4 performs the same function as that of the Listing 3. Rows 4-5 of the Listing 4 are inside a fictitious syntactical element OOO_Retire. Any instructions within the block of code that is surrounded by the curly braces (i.e., the open brace "{" and the close brace "}") can be retired out-of-order.

| Listing 4 | |
|---|---|
| 1 | int radius = 5; |
|   | float area; |
| 2 | . . . |
| 3 | OOO_Retire { |
| 4 | area = 3.14 * radius * radius; |
| 5 | radius++; |
| 6 | } |
| 7 | . . . |

The instruction set of the processor can include instructions that direct the processor to start and stop out-of-order retirement of instructions. An example of such instructions can be OOOSR (e.g., "Out-Of-Order StaRt") and OOOST (e.g., "Out-Of-Order STop"). In an example, and referring to Listing 3, a compiler, upon encountering "#OOO start" can include "OOOSR" in the compiled program; and upon encountering "#OOO stop" can include "OOOST" in the compiled program.

At 402, the technique 400 receives processor instructions of a program. For example, the technique 400 can receive processor instructions corresponding to high-level statements of rows 4-5 of Listing 3 or Listing 4. The processor instructions can include a first instruction and a second instruction. The first instruction precedes the second instruction in the program order of the program. For example, in the case of Listing 1, the first instruction can be the fMUL instruction and the second instruction can be the ADD instruction.

At 404, the technique 400 receives a start instruction. As mentioned above, the start instruction can immediately precede the processor instructions and can indicate that the processor instructions are to be retired out-of-order. The start instruction can be, or can be similar to, the OOOSR instruction described above.

At 406, the technique 400 receives a stop instruction. The stop instruction can immediately succeed (i.e., follow, etc.) the processor instructions and can indicate a stop to out-of-order instruction retirement. The stop instruction can be, or can be similar to, the OOOST instruction described above.

At 408, in response to completing execution of the second instruction before completing execution of the first instruction, the technique 400 retires the second instruction before retiring the first instruction.

In an example, the processor can include a pipeline of stages, as described above with respect to FIG. 2. The stages of the pipeline can include a first subset (i.e., a first one or more pipeline stages) and a second subset (i.e., a second one or more pipeline stages). In an example, the first subset can perform 402-406 of the technique 400, and the second subset can perform 408 of the technique 400. In an example, the first subset can include an instruction (IF) stage. In an example, the second subset can include a write back (WB) stage.

In an example, the technique 400 can use a reorder buffer to determine whether the result of a completed instruction is to be committed (e.g., moved to the register file or to memory).

A reorder buffer can be used as follows: each decoded instruction reserves an entry in the reorder buffer. That is, an entry in the reorder buffer holds information related to each decoded instruction. When an instruction that has an entry in the reorder buffer completes, the result of the completed instruction is written to the corresponding entry of the reorder buffer. Subsequently, the result of the oldest instruction in the reorder buffer that has completed without exception(s) is moved to the register file or memory. Thus, even though instructions can complete out-of-order, results are committed in-order.

However, a reorder buffer, according to some implementations of the out-of-order retirement described in this disclosure, can be such that completed instructions that are not necessarily the oldest in the reorder buffer are retired when the processor is configured to retire such instructions out-of-order. The processor can be configured to retire instructions out-of-order when a start instruction, as described above, is received prior to processing such instructions through the pipeline. The processor can then be configured to stop retiring instructions out-of-order when a stop instruction, as described above, is received.

Figure 5:
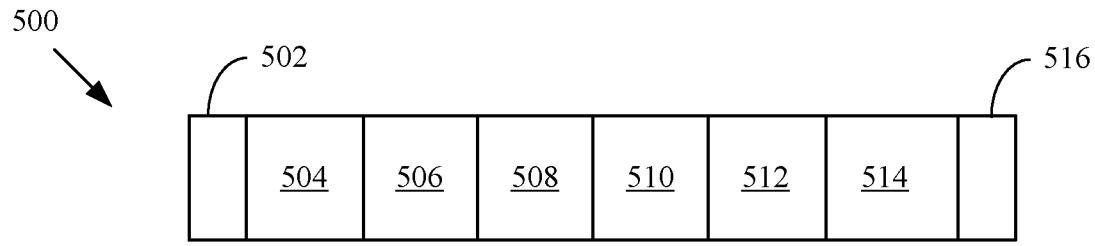
FIG. 5 is an example of a structure of an entry of a reorder buffer.

FIG. 5 is an example of a structure of an entry 500 of a reorder buffer. The entry 500 is a mere example and other configurations (i.e., structures, fields, semantics, etc.) of reorder buffer entries are possible.

A valid bit 502 can indicate whether the entry 500 is currently allocated to an instruction that has not been completed. The instruction of the entry 500 may, upon completion, write a result to a register. As such, a field 504 can indicate the destination register and a field 506 can indicate the value to be written to the register indicated by the field 504. The instruction of the entry 500 may be a store instruction. Thus, a field 508 can indicate the store address and a field 510 can indicate the data to be stored. A field 512 can include the program counter.

A field 514 can include bits for register, data, and/or other control bits. A field 516 can indicate whether the instruction caused an exception when executing.

Bits of the field 514 can be used to track the readiness of the results of the instruction. For example, a bit of the field 514 can indicate whether the result of the instruction has been written to the register indicated by the field 504.

In an example, a bit (i.e., an out-of-order retirement bit) of the field 514 (or another field altogether in the entry 500) can be used to indicate whether the instruction can be retired our-of-order. For example, a bit value of 1 (or 0) can indicate that the instruction can be retired out-of-order and a bit value of 0 (or 1) can indicate that the instruction cannot be retired out-of-order.

The OOOSR and the OOOST instructions described can be used to illustrate setting and unsetting the out-of-order retirement bit. Circuitry or control logic of the processor can set (e.g., to a bit value of 1) the respective out-of-order retirement bit of every instruction that is added to the reorder buffer subsequent to processing the OOOSR instruction to indicate that the instruction can be retired out-of-order. When the processor processes an OOOST instruction, circuitry or control logic of the processor can unset (e.g., to a bit value of 0) the respective out-of-order retirement bit of every instruction that is added to the reorder buffer subsequent to processing the OOOST instruction to indicate that the instruction cannot be retired out-of-order.

When an instruction is completed, if the instruction cannot be retired out-of-order (which can be determined by checking the out-of-order retirement bit), circuitry or control logic of the processor retires the instruction if the instruction is the oldest in the reorder buffer and the instruction did not cause an exception (which can be determined by checking the field 516). If an exception occurred, the result of the instruction is not, for example, written, the pipeline is flushed, and control is transferred to an exception handler.

On the other hand, if the instruction can be retired out-of-order (which can be determined by checking the out-of-order retirement bit), circuitry or control logic of the processor retires the instruction. When an instruction is retired, the valid bit 502 of the corresponding reorder buffer entry can be set to a value indicating that the entry is invalid (e.g., a value of 0).

Figure 6:
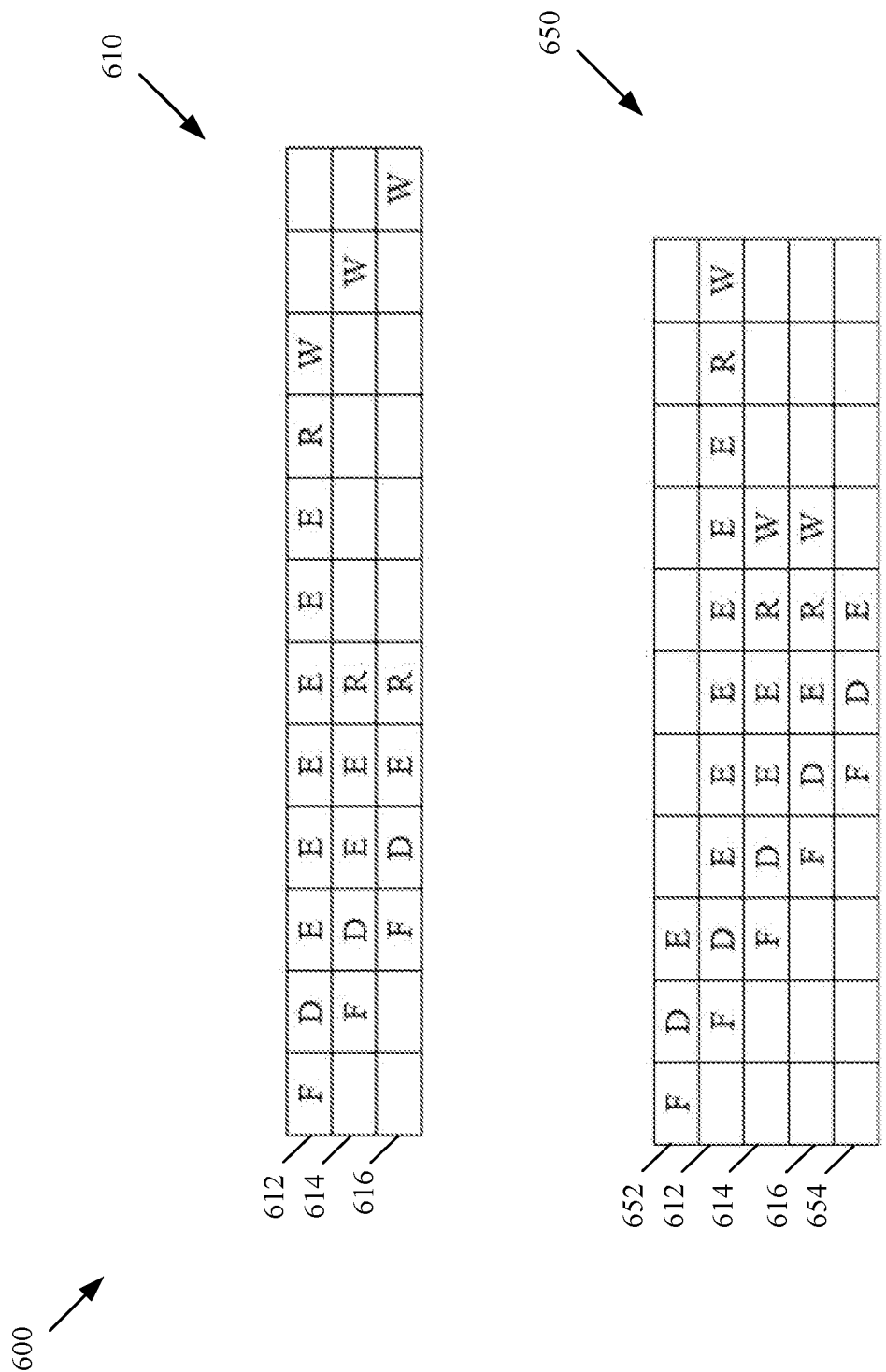
FIG. 6 is a comparative example of in-order and out-of-order retirement of instructions.

FIG. 6 is a comparative example 600 of in-order and out-of-order retirement of instructions. An example 610 illustrates in-order retirement of instructions. An example 650 illustrates out-of-order retirement of instructions.

The example 610 illustrates three instructions that may be moving, one cycle at a time, through a pipeline. "F," "D," "E," "R," and "W" of the comparative example 600 correspond, respectively, to the instruction fetch (IF) stage, the instruction decode (ID) stage, the instruction execution (IE) stage, a reorder buffer write stage, and the a write back (WB) stage.

An instruction 612 is fetched and decoded. The instruction 612 requires six execution cycles. The reorder buffer is updated and the instruction 612 is then written back. An instruction 614 is fetched while the instruction 612 is in the decode stage. After the instruction 614 is decoded, it is completed in two execute cycles. However, as the instruction 614 cannot be retired out-of-order, an entry associated with the instruction 614 is retained in the reorder buffer until the instruction 612 is first retired. An instruction 616 requires one execution cycle and completes execution and reorder buffer write at the same time as the instruction 614. However, the instruction 616 cannot be retired until after instruction 614 is retired. As can be seen, the instructions 612-616 complete in 12 processor cycles.

The example 650 illustrates the same instructions 612-616. However, the instructions 612-616 are bracketed by an instruction 652 and an instruction 654. The instruction 652 can be a start instruction indicating that subsequent instructions can be retired out-of-order. Thus the instruction 652 can be, or can be similar to, the OOOSR described above. The instruction 654 can be a stop instruction indicating that the processor is to no stop retiring instructions out-of-order. Thus, the instructions 614-616 are written back before the instruction 612 is written back. In the example 650, the instructions 612-616 complete in 10 cycles. Additionally, as soon as the instructions 614-616 are written back, the reorder buffer entries associated with the instructions 614-616 can be reused.

Returning to FIG. 4, in some implementations, the technique 400 can include receiving, while the processor instructions are executing, an interrupt (or other asynchronous event); and delaying handling of the interrupt until the processor instructions are processed. For example, the processor can attach the interrupt to an instruction that follows the processor instructions. In an example, the instruction that follows the processor instructions can be the instruction that immediately follows the processor instructions. That is, the technique 400 can hold the interrupt in abeyance until the stop instruction is processed. For example, and referring to FIG. 6, the technique 400 can attach the interrupt to the instruction (not shown) that follows the instruction 654.

In an example, delaying the handling of the interrupt until the processor instructions are processed can include masking the interrupt in response to receiving the start instruction; and unmasking the interrupt subsequent to retiring the processor instructions. Masking the interrupt in this context does not mean the turning off of the interrupt (such as via a mask bit) so that it is not seen, and therefore is ignored and never processed, by the processor.

Traditionally, the processor may sample an interrupt trigger signal during each instruction cycle, and handles the interrupt only if the signal is asserted when sampling occurs.

In some implementations of managing out-of-order retirement, sampling can be disabled until the processor instructions are completed (e.g., until the OOOST instruction is processed). In another example, circuitry (e.g., a hardware latch) can record that the interrupt has occurred, the processing of which can be deferred until the processor instructions are completed. As such, the unmasking of the interrupt subsequent to retiring the processor instructions can include unmasking the interrupt in response to completing the stop instruction.

In another example, interrupt handling is not delayed. Rather, out-of-order retirement can be suspended, the interrupt handled, and out-of-order retirement can be resumed for the remaining processor instructions. Thus, in an example, the technique 400 can include receiving, while the processor instructions are executing, an interrupt; retiring instructions in-order to prepare for handling the interrupt; handling the interrupt; and returning to out-of-order retirement of remaining instructions of the processor instructions of the program. The instructions that are retired in-order can be those that are in the pipeline at the time of that the interrupt is received.

In an example, interrupt handling (or handling any other asynchronous event) can be delayed only for a certain threshold. The threshold can be a time threshold (e.g., 1000 picoseconds, or some other time threshold), a number of processor cycles (e.g., 1000 cycles, or some other processor cycles threshold), a number of instructions (e.g., 1000 instructions, or some other number of instructions), some other threshold, or a combination thereof. The threshold can be a maximum threshold. If the processor instructions complete before the threshold expires (e.g., is met), then the interrupt can be handled and the threshold is ignored. On the other hand, if the threshold expires (e.g., is met) before the processor instructions complete (e.g., before OOOST is processed), then the processor can temporarily switch to out-of-order retirement, as described above.

Thus, in an example, the technique 400 can include receiving, while the processor instructions are executing, an interrupt; and delaying handling of the interrupt while a threshold is not met. In an example, delaying handling of the interrupt while the threshold is not met can include processing a subset of the processor instructions while the threshold is not met; performing the stop instruction; and handling the interrupt.

As described above with respect to FIG. 5, retiring the second instruction before retiring the first instruction can include invalidating an entry of a reorder buffer associated with the second instruction.

Traditionally, managing the reorder buffer (which can be a circular buffer) may require the use of oldest entry pointer and a youngest entry pointer. As mentioned above, traditionally, only completed instructions pointed to by the oldest entry pointer can be retired and a new entry can be inserted at the youngest entry pointer.

In some implementations of out-of-order retirement, an entry not pointed to by the oldest entry pointer can be retired. Thus, the technique 400, after retiring one instruction (or more than one instruction) out-of-order, can rearrange the entries of the reorder buffer so that there are no gaps (e.g., unused entries) between the oldest entry pointer and the youngest entry pointer.

Traditionally, the results of an instruction that is completed out-of-order are not saved in the processor state when an exception occurs. However, in some implementations of out-of-order retirement, the results of such instructions are included in the processor state. As such, in an example, the technique 400 can further include retiring the second instruction (which completes out-of-order); receiving an exception subsequent to retiring the second instruction; and saving a program state of the program such that the program state includes a result of the second instruction.

As mentioned above, the program can be generated from a high-level program that is written in a high-level language. The high-level program can include (e.g., provide, etc.) a high-level start instruction corresponding to the start instruction and a high-level stop instruction corresponding to the stop instruction.

For simplicity of explanation, the technique 400 is depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the technique 400 (and the algorithms, methods, instructions, etc., stored thereon and/or executed thereby, including by technique 400) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. An apparatus for retiring instructions out-of-order, the apparatus comprising:
one or more pipeline stages of a processor configured to:
receive processor instructions comprising two or more and fewer than all processor instructions generated based on a program, the processor instructions comprising a first instruction and a second instruction, the first instruction preceding the second instruction in a program order of the program;
receive a start instruction, the start instruction immediately preceding the processor instructions, and the start instruction indicating that the processor instructions are to be retired out-of-order; and
receive a stop instruction, the stop instruction immediately succeeding the processor instructions, and the stop instruction indicating a stop to out-of-order instruction retirement; and
wherein at least a first pipeline stage of the one or more pipeline stages of the processor is configured to:
in response to receiving the start instruction, disable handling of interrupts until out-of-order instruction retirement is stopped after either (1) receiving the stop instruction or (2) temporarily suspending out-of-order instruction retirement, wherein disabling handling of interrupts comprises, after temporarily suspending out-of-order instruction retirement, performing in-order instruction retirement of all processor instructions in the pipeline stage that precede, in the program order of the program, at least one processor instruction that was retired during out-of-order instruction retirement,
handle one or more interrupts after performing in-order instruction retirement of all processor instructions in the pipeline stage that precede, in the program order of the program, at least one processor instruction that was retired during out-of-order instruction retirement, and
resume out-of-order instruction retirement after handling the one or more interrupts.

2. The apparatus of claim 1, wherein the program is generated from a high-level program that is written in a high-level language, and wherein the high-level program comprises a high-level start instruction corresponding to the start instruction and a high-level stop instruction corresponding to the stop instruction.

3. The apparatus of claim 1, the apparatus further configured to:
receive, while the processor instructions are executing, an asynchronous event; and
delay handling of the asynchronous event while a threshold has not expired.

4. The apparatus of claim 3, wherein to delay handling of the asynchronous event while the threshold is not met comprises to:
process a subset of the processor instructions while the threshold has not expired;
perform the stop instruction after the threshold has expired; and
handle the asynchronous event after the stop instruction has been performed.

5. The apparatus of claim 1, wherein stop instructions, including said stop instruction, are different from start instructions, including said start instruction.

6. The apparatus of claim 1, wherein the disabling handling of interrupts comprises, in response to receiving the start instruction, disabling sampling of an interrupt trigger signal that triggers handling of an interrupt only if the interrupt trigger signal is asserted when the sampling occurs.

7. The apparatus of claim 6, wherein the first pipeline stage is configured to, in response to receiving the stop instruction, enable sampling of the interrupt trigger signal.

8. The apparatus of claim 6, wherein, before the sampling is disabled, the sampling of the interrupt trigger signal occurs during each of a plurality of execution cycles that are based on clock cycles of a clock signal.

9. The apparatus of claim 1, wherein the disabling handling of interrupts comprises recording one or more interrupts and delaying handling of the one or more interrupts until after receiving the stop instruction.

10. The apparatus of claim 9, wherein the recording is performed using hardware latch circuitry.

11. A method for retiring instructions out-of-order, the method comprising:
receiving processor instructions comprising two or more and fewer than all processor instructions generated based on a program, the processor instructions comprising a first instruction and a second instruction, the first instruction preceding the second instruction in a program order of the program;
receiving a start instruction, the start instruction immediately preceding the processor instructions, and the start instruction indicating that the processor instructions are to be retired out-of-order;
receiving a stop instruction, the stop instruction immediately succeeding the processor instructions, and the stop instruction indicating a stop to out-of-order instruction retirement;
in response to receiving the start instruction, disabling handling of interrupts until out-of-order instruction retirement is stopped after either (1) receiving the stop instruction or (2) temporarily suspending out-of-order instruction retirement, wherein disabling handling of interrupts comprises, after temporarily suspending out-of-order instruction retirement, performing in-order instruction retirement of all processor instructions in the pipeline stage that precede, in the program order of the program, at least one processor instruction that was retired during out-of-order instruction retirement;
handling one or more interrupts after performing in-order instruction retirement of all processor instructions in the pipeline stage that precede, in the program order of the program, at least one processor instruction that was retired during out-of-order instruction retirement; and
resuming out-of-order instruction retirement after handling the one or more interrupts.

12. The method of claim 11, wherein the program is generated from a high-level program that is written in a high-level language, and wherein the high-level program comprising a high-level start instruction corresponding to the start instruction and a high-level stop instruction corresponding to the stop instruction.

13. The method of claim 11, further comprising:
receiving, while the processor instructions are executing, an asynchronous event; and
delaying handling of the asynchronous event while a threshold has not expired.

14. The method of claim 13, wherein delaying handling of the asynchronous event while the threshold is not met comprising:
   processing a subset of the processor instructions while the threshold has not expired;
   performing the stop instruction after the threshold has expired; and
   handling the asynchronous event after the stop instruction has been performed.

15. The method of claim 11, wherein stop instructions, including said stop instruction, are different from start instructions, including said start instruction.

16. The method of claim 11, wherein the disabling handling of interrupts comprises, in response to receiving the start instruction, disabling sampling of an interrupt trigger signal that triggers handling of an interrupt only if the interrupt trigger signal is asserted when the sampling occurs.

17. The method of claim 16, further comprising, in response to receiving the stop instruction, enabling sampling of the interrupt trigger signal.

18. The method of claim 16, wherein, before the sampling is disabled, the sampling of the interrupt trigger signal occurs during each of a plurality of execution cycles that are based on clock cycles of a clock signal.

19. The method of claim 11, wherein the disabling handling of interrupts comprises recording one or more interrupts and delaying handling of the one or more interrupts until after receiving the stop instruction.

20. An apparatus for retiring instructions out-of-order, the apparatus comprising:
   means for storing, as stored processor instructions, processor instructions that have been generated based on a program; and
   means for executing the stored processor instructions, the executing including:
      receiving processor instructions comprising two or more and fewer than all of the processor instructions, the processor instructions comprising a first instruction and a second instruction, the first instruction preceding the second instruction in a program order of the program,
      receiving a start instruction, the start instruction immediately preceding the processor instructions, and the start instruction indicating that the processor instructions are to be retired out-of-order,
      receiving a stop instruction, the stop instruction immediately succeeding the processor instructions, and the stop instruction indicating a stop to out-of-order instruction retirement,
      in response to receiving the start instruction, disabling handling of interrupts until out-of-order instruction retirement is stopped after either (1) receiving the stop instruction or (2) temporarily suspending out-of-order instruction retirement, wherein disabling handling of interrupts comprises, after temporarily suspending out-of-order instruction retirement, performing in-order instruction retirement of all processor instructions in the pipeline stage that precede, in the program order of the program, at least one processor instruction that was retired during out-of-order instruction retirement,
      handling one or more interrupts after performing in-order instruction retirement of all processor instructions in the pipeline stage that precede, in the program order of the program, at least one processor instruction that was retired during out-of-order instruction retirement, and
      resuming out-of-order instruction retirement after handling the one or more interrupts.

\* \* \* \* \*